Feb. 21, 1956
J. SUNNEN
2,735,188
HOLE GAGE
Filed May 26, 1952
5 Sheets-Sheet 1
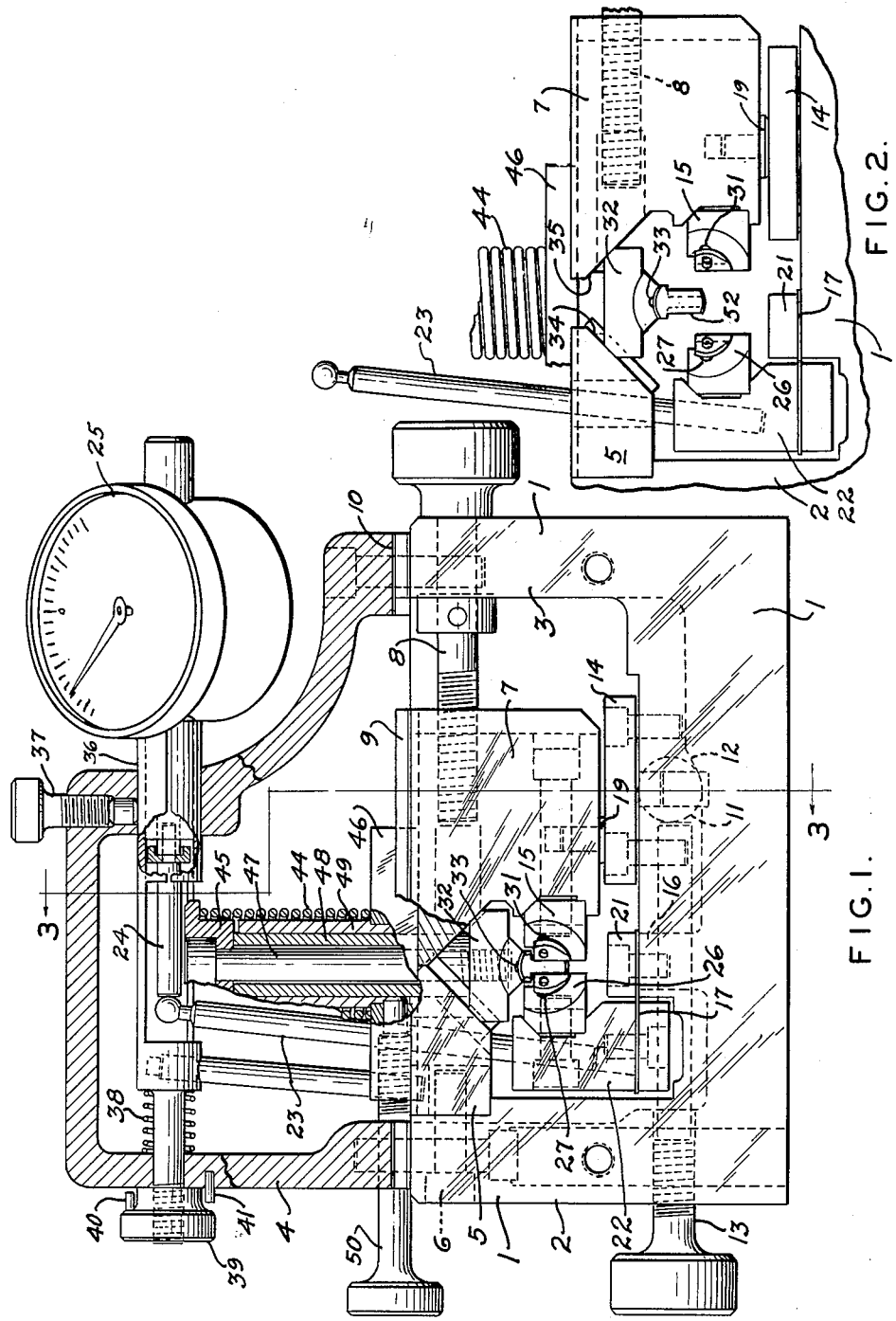
INVENTOR.
JOSEPH SUNNEN
BY George R. Ericson
ATTORNEY.

Feb. 21, 1956     J. SUNNEN     2,735,188
HOLE GAGE

Filed May 26, 1952     5 Sheets-Sheet 2

INVENTOR.
JOSEPH SUNNEN
BY George R. Ericson
ATTORNEY

*INVENTOR.*
JOSEPH SUNNEN

ATTORNEY

Feb. 21, 1956  J. SUNNEN  2,735,188
HOLE GAGE

Filed May 26, 1952  5 Sheets-Sheet 4

*INVENTOR.*
JOSEPH SUNNEN
BY
ATTORNEY

Feb. 21, 1956
J. SUNNEN
2,735,188
HOLE GAGE
Filed May 26, 1952
5 Sheets-Sheet 5
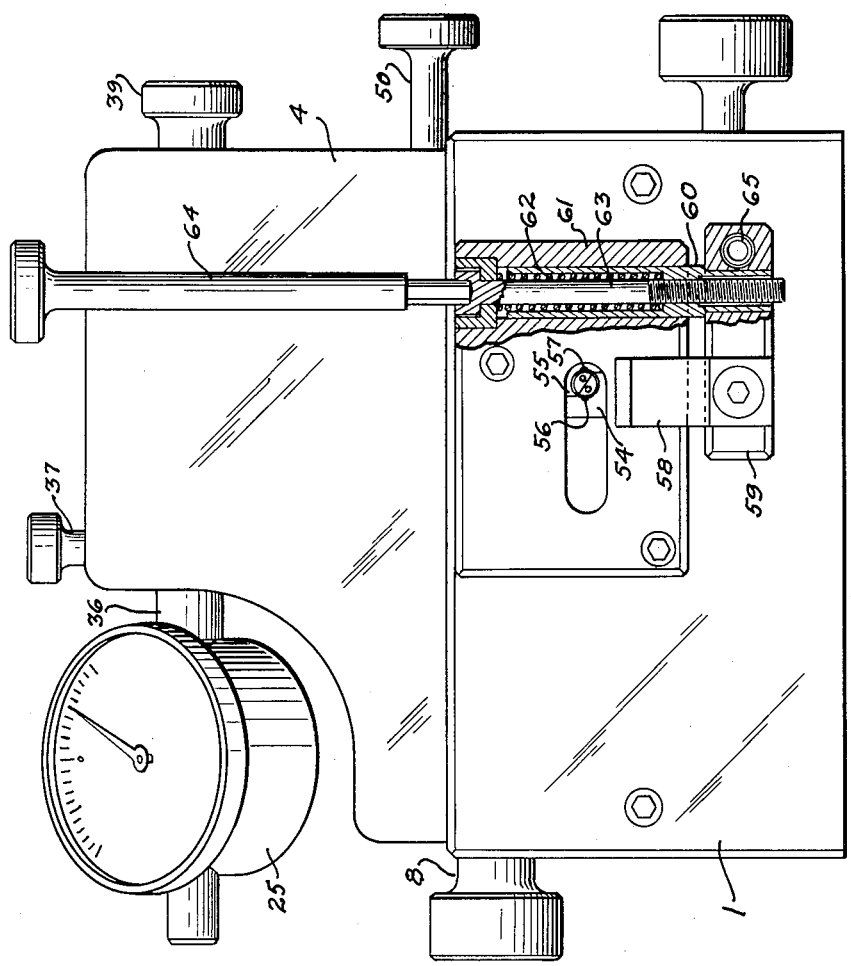
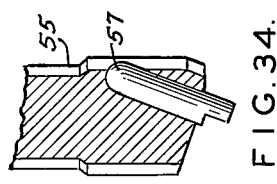
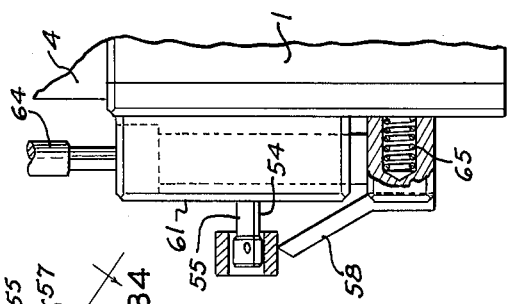
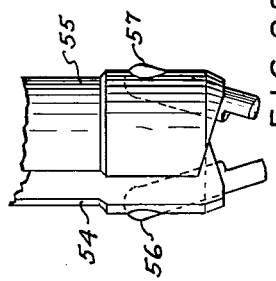
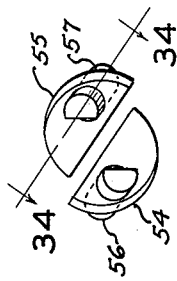
INVENTOR.
JOSEPH SUNNEN
BY
*George R. Ericson*
ATTORNEY

United States Patent Office 2,735,188
Patented Feb. 21, 1956

2,735,188
HOLE GAGE

Joseph Sunnen, Clayton, Mo.

Application May 26, 1952, Serial No. 289,990

10 Claims. (Cl. 33—178)

This invention relates to gages and particularly to gages for use in checking the inside diameters of holes. It is most useful where substantial numbers of pieces are to be made with holes of the same diameter. It is important under such circumstances to provide a gage with which the operator can check the hole diameter with speed and precision without the probability of errors in manipulation. One of the most difficult problems in gaging the diameter of a hole is to insure the location of the gage exactly on the diameter of the hole and not merely on a chord. Another problem in the gaging of holes in large production is that of the wear on the gage points. When the operator is gaging each one of a great number of holes, some wear of the gage points is inevitable.

It is an object of this invention to provide a hole gage which may be quickly operated to measure or compare diameters of holes with extreme accuracy and with a minimum probability of human error.

It is a further object of this invention to provide a hole diameter gage with means to insure the measurement being taken exactly on the diameter of the hole.

It is a further object of my invention to provide a hole gage for use under conditions likely to cause wear on the gaging points and with special means to renew the surface of the gaging points.

It is a further object of this invention to provide a gage of the above described character which can be used for gaging the diameters of very small holes.

The above and other objects are attained by the inventions disclosed herein which will be more fully understood by reference to the following specification and accompanying drawings, in which—

Figure 1 is a front elevation of a gage device constructed in accordance with the invention, with parts shown in section, and others broken away.

Figure 2 is a fragmentary view showing the arrangement of the gage points in a partially expanded position.

Figure 26 is a rear elevation of the device shown in Figure 1 showing the small hole gage points, parts being broken away and others shown in section.

Figure 27 is a fragmentary view showing the ends of the small hole gaging point holders and external centralizer.

Figure 28 is an enlarged view showing ends of the small hole gaging point holders.

Figure 29 is an end view of the parts shown in Figure 28.

Figure 34 is a detail sectional view showing the manner in which the end of the holder is drilled to receive the gage point for small holes.

Figure 4:
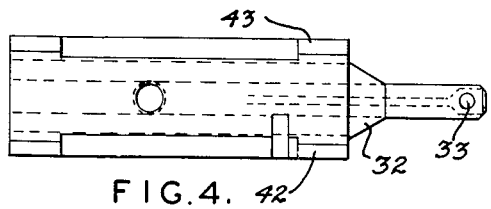
Figure 4 is a detail plan view of the centralizing point holder.

The reference numeral 1 indicates the main frame or body structure of a gage which carries uprights 2 and 3 to support an upper body member 4. A stationary guide block 5 is attached to the upright 2 by means of screws 6, and a slidable guide block 7 is connected to the upright 3 by a screw 8 by means of which it may be moved toward or away from the guide block 5. The slidable guide block is provided with a V-shaped way or rib 9 which is received in a corresponding guide groove 10 formed in the lower face of the upper body member 4, the block being held in slidable engagement therewith by means of the ball 11 forced to roll up on the cam 12 by the screw 13, thereby causing the block 14 supported by ball 11 to press upwardly toward the bottom of the guide block 7, so that the guide block may be moved in a rectilinear direction to the right or left with respect to Figure 1. Further tightening of the screw 13 will lock the block 7 in position. The guide block 7 carries a gage point holder 15.

Figure 3:
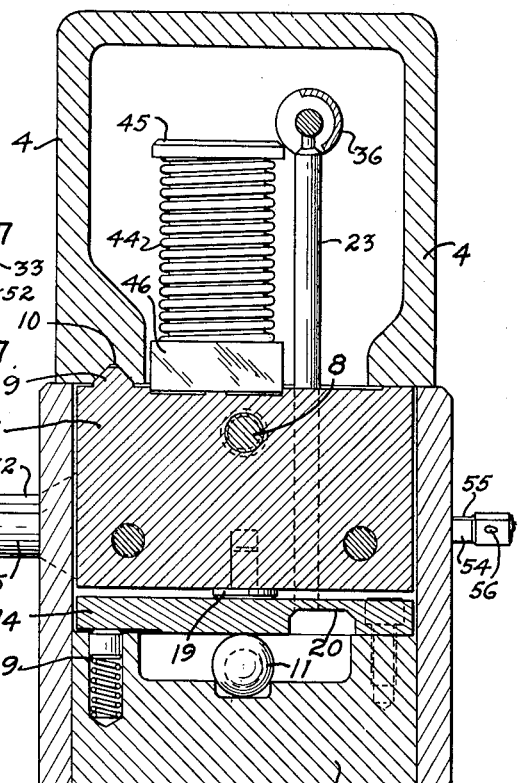
Figure 3 is a cross sectional elevation taken on the line 3—3 of Figure 1 looking in the direction of the arrows.
Figure 8:
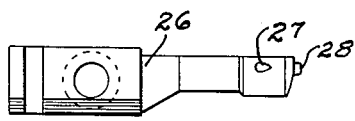
Figure 8 is a detail view showing one of the gaging point holders.
Figure 9:
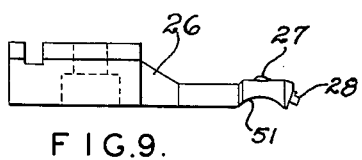
Figure 9 is a bottom view of the gage point holder shown in Figure 8.
Figure 21:
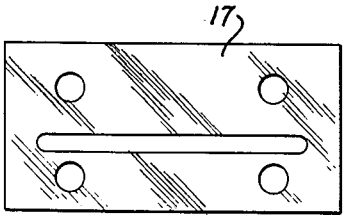
Figure 21 is a plan view of the flexible reed which supports the sensitive gage point support.
Figure 22:
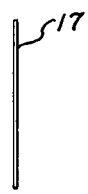
Figure 22 is an end view of the reed shown in Figure 21.

The base member 1 has an upright 16 which carries a reed 17 formed of thin spring steel as shown in Figures 21 and 22. The reed is rigidly held in position on top of the member 16 by a cap block 21 which is screwed to the top of the upright 16 as indicated in Figure 1. The pressure block 14 is bolted firmly to the frame 1 but is flexible enough to be brought into frictional contact with the pad 19 by reason of the flexibility in the thin section 20. A spring device 29 is provided to take up lost motion as shown in Figure 3. Attached to the side of the reed opposite the upright 16 is the sensitive gage point holder support 22 which by reason of the flexible nature of the reed 17 can pivot slightly about a horizontal, virtual axis with respect to Figure 1, causing the gage operating arm 23 to swing and to operate the stem 24 of the dial indicating gage 25. As will be noted, the rod 23 is rigidly fixed in the member 22 and constitutes a motion multiplying member of substantial efficiency, as the distance between the hinge member 17 and the sensitive gage holder 26 is much less than the distance from the hinge to the contact with the member 24.

Figures 10, 11:
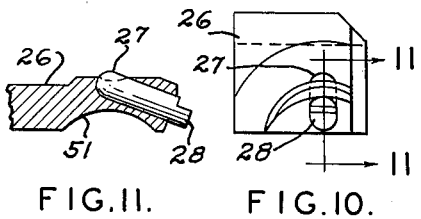
Figure 10 is an enlarged end view of the gage point holder shown in Figures 8 and 9.
Figure 11 is a longitudinal sectional detail view of the end portion of the gage point holder shown in Figure 10 and is taken along line 11—11 of Figure 10.

The sensitive gage point holder 26 is a separate piece carried by the yieldably mounted support member 22 and coextends in parallel relationship with the aforementioned gage point holder 15. The gage point holders 15 and 26 carry contact points 31 and 27 at their outer ends. These contact points consist of short cylindrical pieces of steel hardened and ground and formed at one end to receive a wrench as at 28 (Figure 11) and having their other ends formed hemispherical surfaces 27. The contact points 27 and 31 are frictionally held in bores in the ends of the members 15 and 26, but they may be rotated by applying a wrench or similar tool to their ends 28, so that when their hemispherical tips become worn through use, they can be rotated so as to present a fresh, unworn surface for contacting the work which is to be measured.

Figures 14, 30:
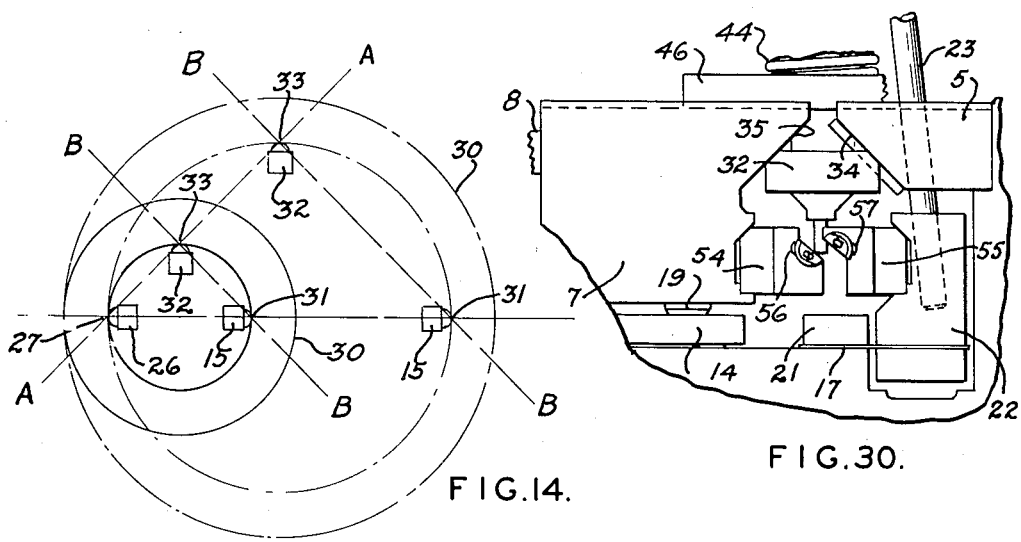
Figure 14 is a diagram showing the lines along which the gage points are moved.
Figure 30 is a detail view showing how the small hole gage point holders are mounted on the sensitive and sliding blocks.
Figure 31:
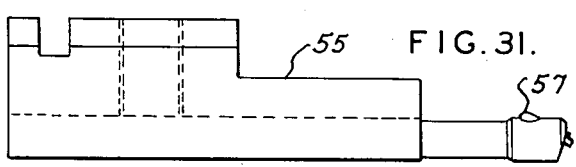
Figure 31 is an enlarged plan view of one of the small hole gage point holders.
Figure 33:
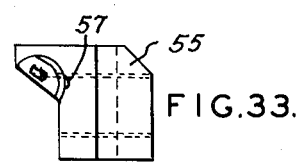
Figure 33 is an enlarged end view of the small hole gage point holder shown in Figures 31 and 32.
Figure 32:
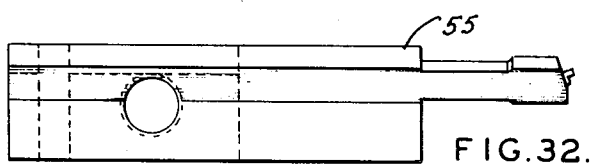
Figure 32 is an enlarged side view of the small hole gage point holder shown in Figure 31.
Figure 15:
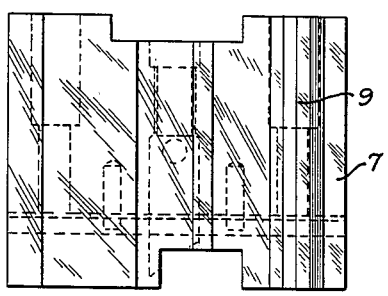
Figure 15 is a detail plan view of the sliding gage point holder.
Figure 23:
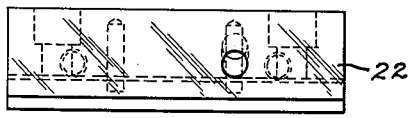
Figure 23 is a plan view of the support for the sensitive gage point holder.
Figure 24:
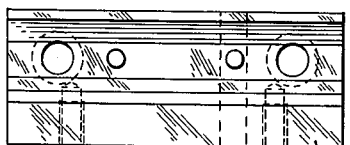
Figure 24 is a side view of the support for the sensitive gage point holder.
Figure 25:
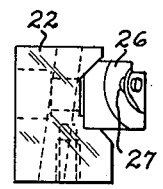
Figure 25 is an end view of the support for the sensitive gage point holder.
Figure 16:
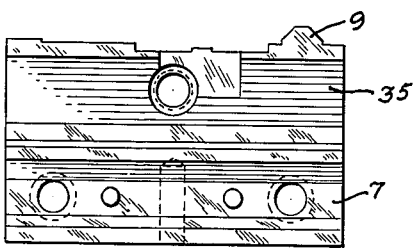
Figure 16 is a side view of the sliding gage point holder.
Figure 17:
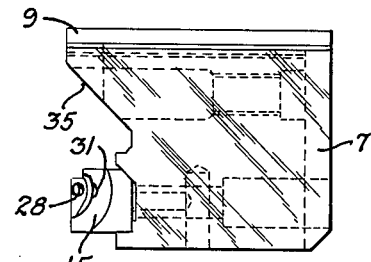
Figure 17 is an end view of the sliding gage point holder.

It will be understood that the device shown herein is particularly adapted for measuring the inside diameters of rings and cylinders, such as indicated at 30 in Fig. 14 and the work frequently constitutes comparing the diameter of the hole in the piece which is being finished with the diameter of a known ring gage or a micrometer. In order to insure the accurate measurement of the work, it is essential that it be centralized by holding the sensitive gage point 27 and the adjustable gage point 31 accurately in contact with the inner surface of the hole which is being checked along a diameter, and not merely along a chord.

Since this position can not be maintained manually with any degree of accuracy, I provide a gage centralizing member 32. Member 32 has a T-shaped beam portion extending outwardly from the base member, and the outer end of this T-shaped portion has a thickened web portion 52 in which is mounted a contact point 33. The centralizing member 32 is so arranged and controlled as to cause the contact point 33 to be held at all times on the circumference of the circle of which the line joining the gage points 27 and 31 is a diameter. This presents the problem of so controlling the movement of the centralizing member 32 during the adjustment of the position of the point 31 as to cause point 33 to remain in a plane which is a perpendicular bisector of the line joining points 27 and 31 and to maintain the point 33 at a distance from said line equal to one-half the length of the line.

I have solved the problem of centralization by forming a guide surface 34 on the block 5 at an angle of 45 degrees to the horizontal, by forming another guide surface 35 on the face of the adjustable guide block 7, and by mounting the centralizing member 32 so as to be slidable vertically and horizontally and biased vertically upward, so that as the guide block 7 slides inwardly or outwardly towards or away from the sensitive support block 22, the two surfaces 34 and 35 cooperate to move the contact point 33 downwardly and inwardly at the same rate as the point 31 moves inwardly, and vice versa. The gage 25 has stem 36 fitted into a bore in the upper body member and adjustably locked in position by the screw 37. The stem 36 is slidable against the spring 38 and adjustable by means of thumb screw 39 which may be limited to an adjustment of less than one turn by the pins 40 and 41 as shown. The pitch of the threads on the screw 39 is such that a single turn is ample to swing the needle of the gage around to zero. The stem 36 of the gage is cut away at one side to permit the swinging arm 23 to contact and operate the sensitive operating stem 24 of the gage 25.

Figure 5:
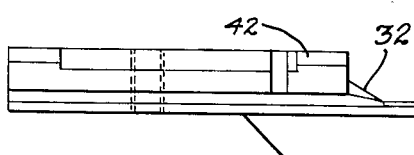
Figure 5 is a side elevation of the centralizing point holder shown in Figure 4.
Figure 6:
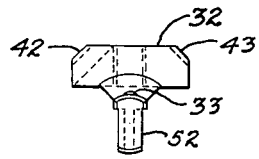
Figure 6 is an end view of the centralizing point holder shown in Figures 4 and 5.
Figure 7:
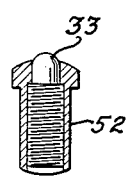
Figure 7 is a cross-sectional view of the centralizing point holder taken near its end on line 7—7 of Figure 5.
Figure 18:
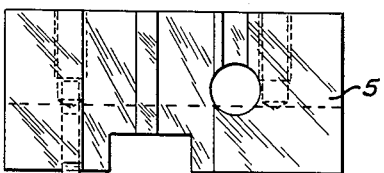
Figure 18 is a plan view of the stationary guide member.
Figure 19:
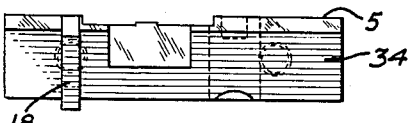
Figure 19 is a side view of the stationary guide member.
Figure 20:
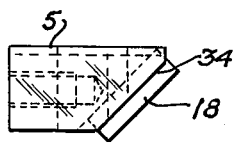
Figure 20 is an end view of the stationary guide member.

The centralizing gage point member 32 is provided with guide surfaces 42 and 43 formed at an angle of 90 degrees to each other and each at an angle of 45 degrees to the horizontal for the purpose of contacting guiding surfaces 34 and 35. It is held in contact therewith by the spring 44 which is carried between the cap 45 and a block 46 which rests on the upper surfaces of the sliding guide block 7 and the stationary guide block 5. A screw 47 is mounted in the centralizing member 32 and extends upwardly through the cap 45. A bushing 48 loosely surrounds the screw, and a cylindrical guide member 49 is attached to the block 46 to hold the assembly in alignment. A thumb screw 50 is threaded into the block 46 and may be brought into firm contact with the bushing 48 to lock the parts in any adjusted position when desired. The block 5 has a key 18 projecting from its surface 34, see Figures 18 to 20, which engages a groove in member 32, see Figures 4 to 6, for the purpose of maintaining horizontal alignment of centralizing member 32.

Figure 12:
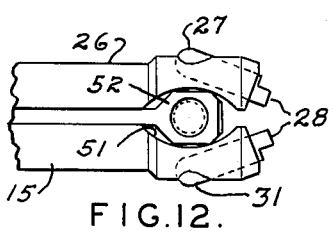
Figure 12 is a detail bottom view showing the way in which the gage point holders are conformed to each other to conserve space.
Figure 13:
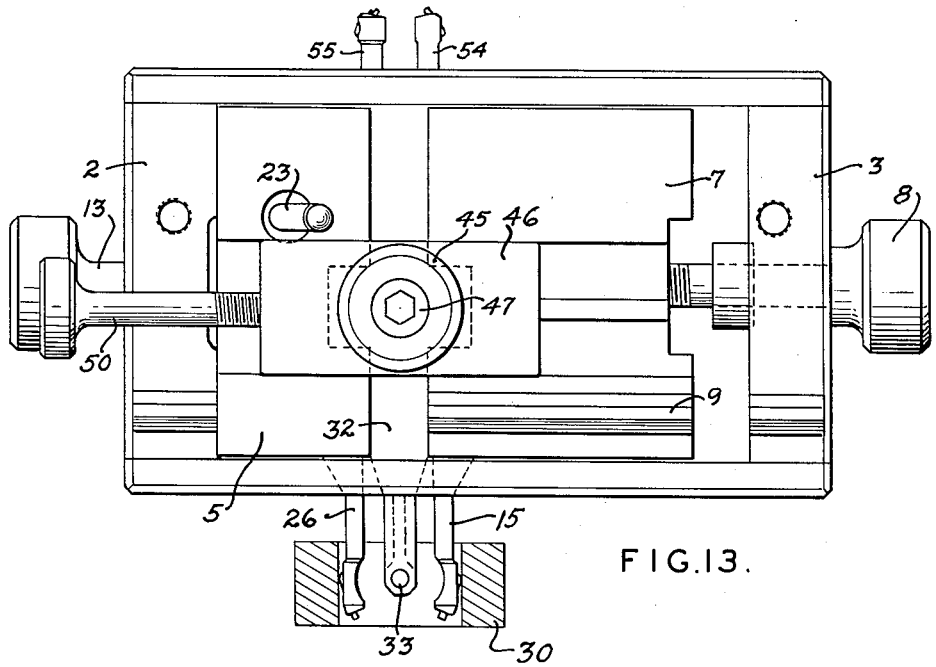
Figure 13 is a plan view of the gaging device with the upper part removed.

It will be noted that the point holders 15 and 26 project from one side of the gaging device, and that these members are attached to the sliding guide block 7 and the sensitive gage point holder support 22, respectively. These members are constructed and arranged so that when they are in a contracted position they may be entered into a very small bore, so as to gage a bore as small as ⅝ inch in diameter. In spite of the small size to which the gage members can be contracted, the design preserves the maximum strength and rigidity. It will be noted that the bores in the ends of members 26 and 15 which receive gage points 27 and 31 are formed at an angle to the axes of these members and that portions of the meeting surfaces of these members are cut away, as indicated at 51 in Fig. 12, so as to provide clearance for the enlargement 52 at the end of the centralizing member 32. The centralizing contact member 33 has a threaded portion by means of which it is threadedly engaged for adjustable positioning in the enlargement 52 of the centralizing member, as indicated in Figure 12. The formation of the ends of gage point holders 26 and 15 to conform to the contour of the centralizing point holder 32 and the design of the point holders 26 and 15 are substantial features of my invention, as they enable the operator to get more rigidity in positioning and accuracy of gaging small holes than is possible with previous designs.

Where it is necessary to go down to still smaller sizes and measure holes too small for the entry of the gage points 27, 31 and 33, I am nevertheless able to accomplish satisfactory gaging by means shown in Figures 26 to 34, inclusive. These figures show the arrangement of the gaging members projecting from the rear face of the gage. In this arrangement, the centralizing and supporting member is independently adjustable and is arranged to engage the exterior surface of the work having the bore to be gaged. Also, a special design and arrangement of the gage points and holders therefor constitutes an important feature of the invention.

It will be noted in Fig. 30 that the gage point holder 54 is mounted on the sliding guide block 7, while the gage point holder 55 is mounted on the sensitive gage support member 22. The members 54 and 55 are shaped so as to fit inside of a cylinder and to conform to each other by meeting in a flat surface in a plane at 45 degrees toward the horizontal while they are adjusted to and away from each other in a horizontal direction as guided by the track 10.

The contact points 56 and 57, like contact points 27 and 31, consist of short pieces of hardened, cylindrical stock ground to a hemispherical point at one end and flattened at their other ends to provide a wrench portion. These contact points are entered into and held by friction in bores in the ends of the holders 54 and 55. These bores lie at a slight angle to the axes of the holders 54 and 55, and the axes of these bores lie in a plane parallel to the flat inside surfaces of the semi-cylindrical end portions of holders 54 and 55, as indicated in Figure 29. The contact point receiving bores in the holders 54 and 55, as well as in holders 15 and 26, enter at the ends of the holders and partially break through the side walls of the holders so as to provide a partial bore bottom against which a portion of the round end of the contact point bears, while the remaining portion of the rounded end projects through the break-through at the side of the holder. It will be seen from the foregoing whenever the operator considers that contact points have become worn, a partial rotation of the contact point causes a new contact surface to be presented. The fact that a portion of the rounded end of the contact point is seated against the partial bottom of the bore permits the operator to make such rotational adjustment with the confidence that the contact point has not been moved longitudinally. By the foregoing arrangement, I am able to gage holes of ¼ inch diameter and even less without undue sacrifice of rigidity. However, in arranging the gage points as shown in Figures 26 to 34, I have removed the centralizing member from a position where it engages the wall of a bore and have substituted a separately adjustable centralizing and supporting member 58 mounted on a manually adjustable slide 59 which is carried by a tubular adjustable support 60 mounted in a block 61 and adjustable against the pressure of the spring 62 by means of the screw 63 which, in turn, may be operated by the thumb screw of key 64 to adjust the vertical position of the support 58 until the contact members 56 and 57 are positioned on a diameter of the work, a condition which can readily be determined by adjustment of the key 64 while observing the action of the gage. The spring 62 is provided for the purpose of taking up any lost motion in the sliding mount of the tube 60 in the block 61.

With reference to the diagram shown in Figure 14, the work positioning point 33 is shown as contacting the inside surface of the cylinder 30 which is being measured. The weight of the cylinder is carried by the contact member 33, and the position of the contact member is on the circumference of a circle at a point equidistant from the contact points 27 and 31. The point 31 is rigidly held in its adjusted position while point 27 may be slightly deflected for the purpose of actuating the gage.

In order to adjust the spacing of the points to the diameter of the bore of the member 30, it is only necessary to operate the screw 8 which withdraws or advances the sliding block 7 and the contact member 31 which is carried by it. With the contact points 27, 31 and 33 once arranged as described, with the point 33 at the circumference of a circle on which the points 27 and 31 lie at the opposite ends of a diameter, it will be seen that this relative position of the points is maintained as follows.

When the screw 8 is operated to move the contacts 27 and 31 toward each other, the two surfaces 34 and 35, which are parallel to the lines A—A and B—B, respectively, approach each other at an angle which causes the centralizing gage point holder 32 and its point 33 to move downwardly and to the left along the line A—A in a path which is parallel to the surface 34 carrying the positioning member 33 with it. In other words, the locus of the contact point 33 is a line in a plane at 45 degrees to the horizontal so that by mounting this member originally in the desired position, it passes toward and, theoretically, through point 27. It will always be in position to contact the uppermost point of a circle of which a diameter is determined by the points 27 and 31. This condition necessarily follows from the fact that the locus of the intersection of the vertical diameter with the circle is in a line drawn at 45 degrees from the horizontal diameter of the circle and in the intersection of two such lines drawn from opposite sides. Bearing in mind that the surface 35 of the sliding block is at 45 degrees with the horizontal and that it intersects the plane of the surface 34, the member 32 which is positioned by these surfaces must always hold the contact point 33 in a position to maintain the points 27 and 31 on a diameter of the circle.

In operation, the operator sets the gage to the diameter of the pieces which he desires to compare by adjusting the screw 8 until the points 27 and 31 are substantially spaced apart by a distance equal to the diameter of the pieces to be measured. This initial adjustment is then increased until the needle of the gage shows some displacement as the ring gage or micrometer is moved over the points 27 and 31. The ring gage is then held in position downwardly against the positioning member 33 and in contact with the members 31 and 27, and either the screw 39 or the rotatable dial of the gage 25 is then adjusted to zero position of the dial indicator needle. If desired, the operator may then lock up the gage by tightening screws 50 and 13, so as to maintain the same position over a long series of operations. The parts which the operator is working on may then be placed on the gage points, the same as the ring shown in Figure 14, and variations from the desired diameter noted by means of the gage. This is particularly desirable when the operator has a number of pieces with holes which must be finished to the desired diameter with extreme accuracy, as he can, by means of this gage, quickly and frequently determine the progress of his work with the hone or other finishing tool.

It will be noted from Figure 30 that the large hole centralizing member 32 does not interfere with the action of the small hole gage holders 54 and 55 which may be adjusted together along a line parallel to the track 10 which is followed by the guide block 7 so that when the two members 54 and 55 are adjusted to a substantial contact with each other, the two members have a cross section approaching a circle.

I claim:

1. In a hole gage, a gage point holder of substantially semi-circular cross section having a flat side along the diameter of the circle, said holder having a bore entering the end thereof and extending at an acute angle to the axis of the circle and parallel to the flat side of the holder and a substantially cylindrical gage point in said bore and having a rounded tip extending partially through the body of said holder.

2. In a hole gage, a gage point holder of substantially semi-circular cross section having a flat side along the diameter of the circle, said holder having a bore entering the end thereof and extending at an acute angle to the axis of the circle and parallel to the flat side of the holder and a substantially cylindrical gage point in said bore and having a rounded tip extending partially through the body of said holder, said gage point having a wrench receiving portion at the end opposite the said tip.

3. A gage finger having a bore in one end thereof at a slight angle to its longitudinal axis and extending to but only partially breaking through the side thereof so as to retain a partial bore bottom, and a hardened contact element of cylindrical form snugly fitted therein, said contact element having a longitudinally extending flat surface at one end and said element being placed in said bore with its other end partially bottoming in the partial bottom of said bore and partially projecting from the side of said finger and having its flattened end projecting slightly from the end of said finger whereby it may be grasped by a tool and rotated slightly to present a new projecting surface.

4. In a gage, a contact carrying member having a bore therein, a cylindrical contact element in said bore, said bore entering a first surface of said member at an acute angle with respect to a second surface of said member and extending to said second surface but only partially breaking through it so as to retain a partial bore bottom, said contact element being fitted in said bore with a portion of one end thereof bearing against the partial bore bottom and the remaining portion of the end extending through the partial break-through, and the other end of said contact element projecting outwardly beyond said first surface.

5. In a gage, a casing having a horizontal base portion and a pair of opposite parallel vertical faces, a dial indicator carried by said casing, a first member resiliently mounted in said casing for slight horizontal movement parallel with said faces and having an operative connection with said indicator, a second member slidably mounted in said casing for horizontal movement parallel with said faces, a third member slidably mounted in said casing for movement parallel with said faces and rectilinearly in a path lying at 45° to the path of movement of said second member and having an operative connection with said second member for causing it to be moved thereby, two gaging fingers attached to each of said first and second members, said fingers extending oppositely in pairs and exteriorly through openings in said opposite faces, and a bore centralizing finger attached to said third member and coextending exteriorly of the casing with one of said pairs of gaging fingers and being arranged between and above said gaging fingers.

6. In an internal diameter gage, a main body member having a horizontal base and a vertical gaging surface, a group of three gaging fingers coextending horizontally in parallel relationship from said surface, said group comprising a pair of horizontally spaced gaging fingers, and a work support finger arranged above and between said gaging fingers, and said support finger having a stiffening rib extending downwardly between said gaging fingers.

7. In an internal diameter gage, a main body member having a horizontal base and a vertical gaging surface, a group of three gaging fingers coextending horizontally in parallel relationship from said surface, said group comprising a pair of horizontally spaced gaging fingers one of which is resiliently mounted and the other being horizontally adjustable, and an adjustably mounted work centralizing and support finger arranged between and above said gaging fingers, said support finger being generally T-shaped in cross-sectional configuration and having its vertical web portion extending downwardly between said gaging fingers.

8. A gage as set forth in claim 7 in which the upper surface of the horizontal portion of the T-shaped support finger is arcuate in cross-section, and in which the gaging fingers have a generally semi-cylindrical, cross-sectional configuration with their flat sides vertical and facing each other, and with their upper surfaces cut off sufficiently to permit the group of fingers to be moved into a contracted position in which the flat vertical sides of said gaging fingers are substantially contiguous with the sides of the vertical web portion of said support finger and in which the arcuate surfaces of the three fingers substantially lie on a circle.

9. In an internal diameter gage, a group of three gaging fingers comprising a pair of horizontally spaced gaging fingers coextending in parallel relationship and a work support finger coextending in parallel relationship with said gaging fingers and being arranged above and between them, one of said gaging fingers being relatively stationary and the other of said gaging fingers and said support finger being adjustable, said support finger having a vertical web portion extending downwardly between said gaging fingers and having a thickened web portion near its end for receiving a work contact element, and said gaging fingers having recesses in their adjacent sides for receiving said thickened web portion as said fingers are moved into a contracted position.

10. In an internal diameter gage, a group of three gaging fingers comprising a pair of horizontally spaced gaging fingers coextending in parallel relationship and a work support finger coextending in parallel relationship with said gaging fingers and being arranged above and between them, one of said gaging fingers being relatively stationary and the other of said gaging fingers and said support finger being adjustable, said support finger having a vertical web portion extending downwardly between said gaging fingers, and said gaging fingers having flat, vertical, adjacent sides which are substantially contiguous with the sides of said web portion when said fingers are in a contracted position, a work contact element projecting from the upper surface of said support finger, and each of said gaging fingers having an elongated work contacting element fitted in a bore which enters at the end of the finger and extends at an angle to its axis and breaks through the side thereof.

References Cited in the file of this patent

UNITED STATES PATENTS

| | | |
|---|---|---|
| 1,317,879 | Kramer | Oct. 7, 1919 |
| 1,593,753 | Darlington | July 27, 1926 |
| 1,606,520 | Fellows | Nov. 9, 1926 |
| 1,740,695 | Johansson | Dec. 24, 1929 |
| 2,241,287 | Westcott | May 6, 1941 |
| 2,378,334 | Sirvent | June 12, 1945 |
| 2,411,292 | Rappl | Nov. 19, 1946 |
| 2,588,820 | Gates et al. | Mar. 11, 1952 |
| 2,607,123 | Sheridan | Aug. 19, 1952 |
| 2,607,127 | Wagenhals | Aug. 19, 1952 |

FOREIGN PATENTS

| | | |
|---|---|---|
| 512,736 | Great Britain | Sept. 25, 1939 |
| 552,634 | Great Britain | Apr. 16, 1943 |
| 580,562 | Great Britain | Sept. 12, 1946 |